US012583041B2

US 012583041 B2

(12) United States Patent
Gao

(10) Patent No.: US 12,583,041 B2
(45) Date of Patent: Mar. 24, 2026

(54) PLATE MATERIAL EDGE TRIMMING MACHINE

(71) Applicant: DALIAN FIELD MANUFACTURING CO., LTD, Dalian (CN)

(72) Inventor: Guowu Gao, Dalian (CN)

(73) Assignee: DALIAN FIELD MANUFACTURING CO., LTD, Dalian (CN)

( * ) Notice: Subject to any disclaimer, the term of this patent is extended or adjusted under 35 U.S.C. 154(b) by 432 days.

(21) Appl. No.: 18/035,524

(22) PCT Filed: Nov. 3, 2021

(86) PCT No.: PCT/CN2021/128312
§ 371 (c)(1),
(2) Date: May 5, 2023

(87) PCT Pub. No.: WO2022/095872
PCT Pub. Date: May 12, 2022

(65) Prior Publication Data
US 2023/0398618 A1 Dec. 14, 2023

(30) Foreign Application Priority Data
Nov. 5, 2020 (CN) ......................... 202011220345.X

(51) Int. Cl.
B23D 79/00 (2006.01)
B23Q 5/02 (2006.01)
(52) U.S. Cl.
CPC .............. B23D 79/00 (2013.01); B23Q 5/02 (2013.01)

(58) Field of Classification Search
CPC .................................. B23D 79/00; B23Q 5/02
See application file for complete search history.

(56) References Cited

U.S. PATENT DOCUMENTS 3,696,481 A * 10/1972 Schmidt ................. B21D 9/073
29/520
4,257,293 A * 3/1981 Stahl .................... B23D 31/001
83/519
(Continued)

FOREIGN PATENT DOCUMENTS

CN 2907989 Y 6/2007
CN 201309196 Y 9/2009
(Continued)

OTHER PUBLICATIONS

The International search report for PCT Application No. PCT/CN2021/128312, dated Jan. 20, 2022, 4 pages.
(Continued)

*Primary Examiner* — Omar Flores Sanchez
(74) *Attorney, Agent, or Firm* — East IP P.C.

(57) ABSTRACT

Provided is a plate material edge trimming machine. By means of providing a lifting component that is capable of adjusting the position of a working cutting edge of an edge trimming cutter and a swinging device that is capable of changing the working angle of the edge trimming cutter, the cutter changing period of the edge trimming cutter is prolonged, and the usage and machining range of a production line is expanded, thereby improving the working efficiency of the production line.

7 Claims, 9 Drawing Sheets

(56)                        References Cited

U.S. PATENT DOCUMENTS

| | | | | |
|---|---|---|---|---|
| 10,610,961 B2 * | 4/2020 | Sun | ..................... | B23K 26/073 |
| 2005/0161117 A1 * | 7/2005 | Jagg | ....................... | B23C 3/128 |
| | | | | 144/360 |

FOREIGN PATENT DOCUMENTS

| | | | | | |
|---|---|---|---|---|---|
| CN | 201376215 | Y | 1/2010 | | |
| CN | 102122682 | A | 7/2011 | | |
| CN | 202701986 | U | 1/2013 | | |
| CN | 102989782 | A | 3/2013 | | |
| CN | 105415137 | A | 3/2016 | | |
| CN | 205668184 | U | 11/2016 | | |
| CN | 106863043 | A | 6/2017 | | |
| CN | 208117454 | U | 11/2018 | | |
| CN | 209867397 | U | 12/2019 | | |
| CN | 112191942 | A | 1/2021 | | |
| CN | 213531091 | U | 6/2021 | | |
| JP | 2001135840 | A | 5/2001 | | |
| JP | 2018027604 | A | * | 2/2018 | |
| WO | WO-9616773 | A1 | * | 6/1996 | ............. B26D 7/018 |

OTHER PUBLICATIONS

The First Office Action for Chinese Application No. 202011220345.
X, dated Dec. 7, 2024, 9 pages.
Liu, Wenju, Automotive Electrical System Overhaul Q&A, dated
Apr. 30, 1999, 5 pages.

* cited by examiner

PLATE MATERIAL EDGE TRIMMING MACHINE

CROSS REFERENCE TO RELATED APPLICATION

The present application is a national phase of PCT Application No. PCT/CN2021/128312 filed on Nov. 3, 2021, titled "PLATE MATERIAL EDGE TRIMMING MACHINE" and claiming priority of Chinese Application No. 202011220345.X filed on Nov. 5, 2020, both of which are incorporated herein by reference on their entireties.

TECHNICAL FIELD

The present application relates to a field of continuous plate material processing in an automatic production line, in particular to a plate material edge trimming machine that can trim a shape and appearance of plate material edges.

BACKGROUND

In the field of modern fully automatic welded pipe production lines, the quality of the incoming plate material directly determines the quality of the forming of the welded pipe. If the width of the plate material is nonuniform or edges thereof are uneven, when rolling the plate material to form a pipe material, uneven welding seams will appear when welding the abutting edges of the rolled materials, and in severe cases, it will further affect the forming size of the pipe material. The existing production lines generally use a fixed plate material edge treatment equipment to separately process the plate material and the processed plate material is then fed into the fully automatic welded pipe production line; or, the fully automatic welded pipe production line is provided with a plate material edge treatment equipment for a fixed specification, but such technology cannot cope with high-speed fully automatic welded pipe production lines with variable specifications of plate materials or pipe materials. In the situation that it is required to change the product specification efficiently, the existing technology cannot be competent; moreover, the cutter for processing the edges of the plate material wears out quickly and thus need to be replaced regularly, and the replacement for each time will prolong the production cycle of the product, which will reduce the working efficiency of the production line. In order to eliminate secondary feeding of the material and reduce the time for replacing equipment, it becomes a necessity in the industry to design a plate material edge trimming machine which can be installed on the fully automatic welded pipe production line and can cope with the process for products of multiple specifications and large output.

SUMMARY

Technical Problems

The embodiments of the present disclosure provides a plate material edge trimming machine for trimming and processing a shape and appearance of edges of a continuous plate material in an automatic production line. By providing a lifting assembly that can adjust a position of a working cutter edge of an edge trimming cutter and a swinging device that can change a working angle of the edge trimming cutter, a replacement cycle of the edge trimming cutter can be prolonged, and usage and processing ranges of the production line can be increased, thereby improving the work efficiency of the production line.

BRIEF DESCRIPTION OF THE DRAWINGS

The features, advantages and technical effects of exemplary embodiments of the present application will be described below with reference to the accompanying drawings.

Description of reference numerals: sliding seat 1, first sliding seat 1a, second sliding seat 1b, sliding seat adjusting device 2, transmission screw 2a, first transmission thread 2a1, second transmission thread 2a2, edge trimming device 3, lifting assembly 3a, thread rod 3a1, lifting seat 3a2, edge trimming cutter 3b, swinging device 4, swinging seat 4a, swing adjusting assembly 4b, adjusting bolt 4b8, first thread 4b8a, second thread 4b8b, first swinging body 4b1, first swinging body thread 4b1a, first rotating surface 4b1m, second swinging body 4b2, second swinging body thread 4b2a, second rotating surface 4b2m, continuous plate material w, pin x, swinging seat positioning device d, stationary base g, and supporting roller z.

In the accompanying drawings, the same reference are used for the same components. The accompanying drawings are not drawn to the actual scale.

DETAILED DESCRIPTION

The implementations of the present disclosure are further described in detail below in combination with the accompanying drawings and embodiments. The detailed description of the following embodiments and accompanying drawings are used to exemplarily illustrate the principle of the present disclosure, while not intended to limit the scope of the present disclosure, that is, the present disclosure is not limited to the described preferred embodiments, and the scope of the present disclosure is defined by the claims.

In the description of embodiments of the present disclosure, it should be noted that, unless otherwise stated, "perpendicular" and "parallel" not only refer to "perpendicular" and "parallel" absolutely in mathematical sense, but also can be understood as "roughly perpendicular" and "roughly parallel".

Figure 1:
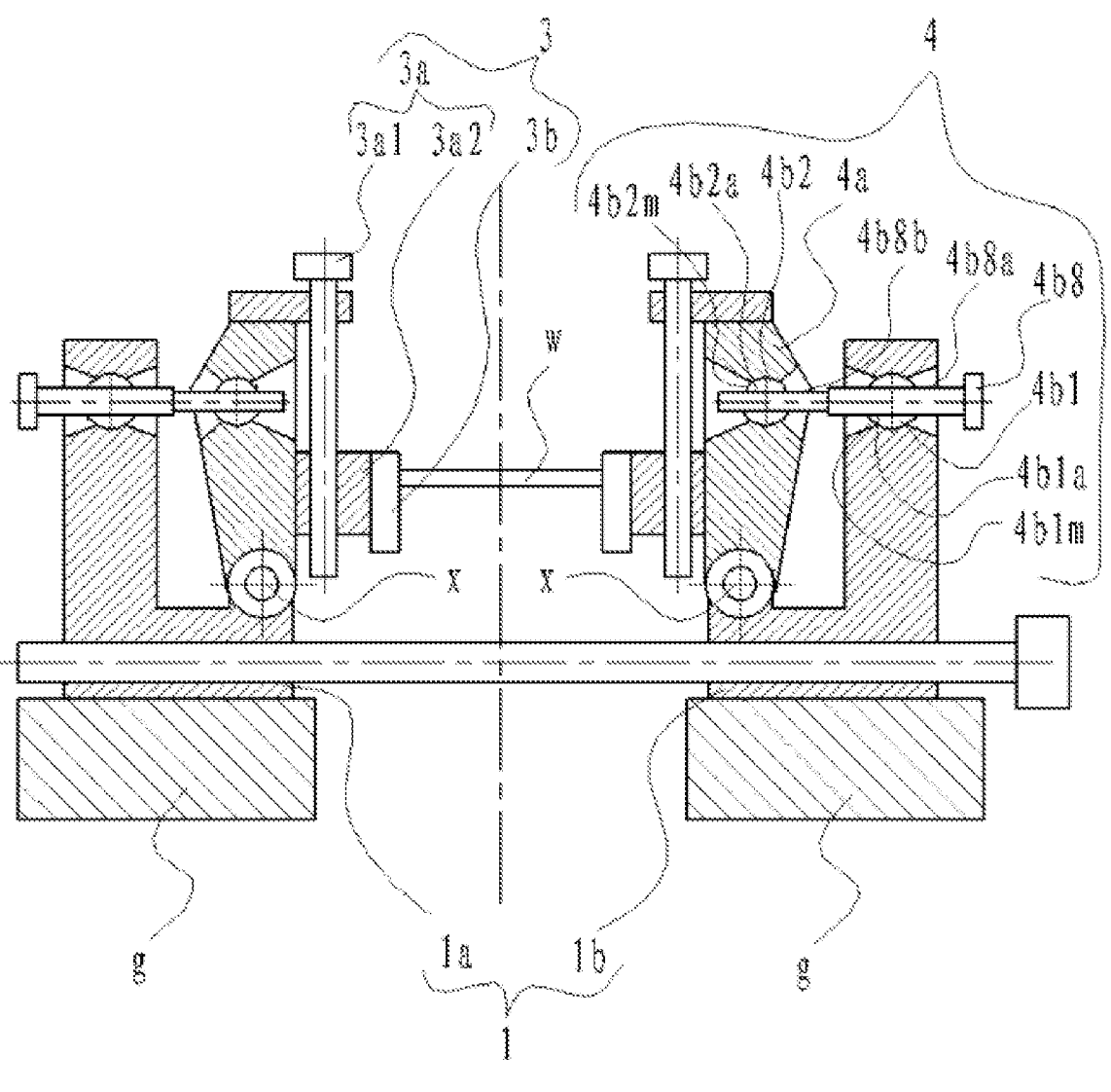
FIG. 1 is a schematic diagram of a basic structure in a first embodiment of the present disclosure.

FIG. 1 is a schematic diagram of a basic structure in the first embodiment of the present disclosure.

Figure 2:
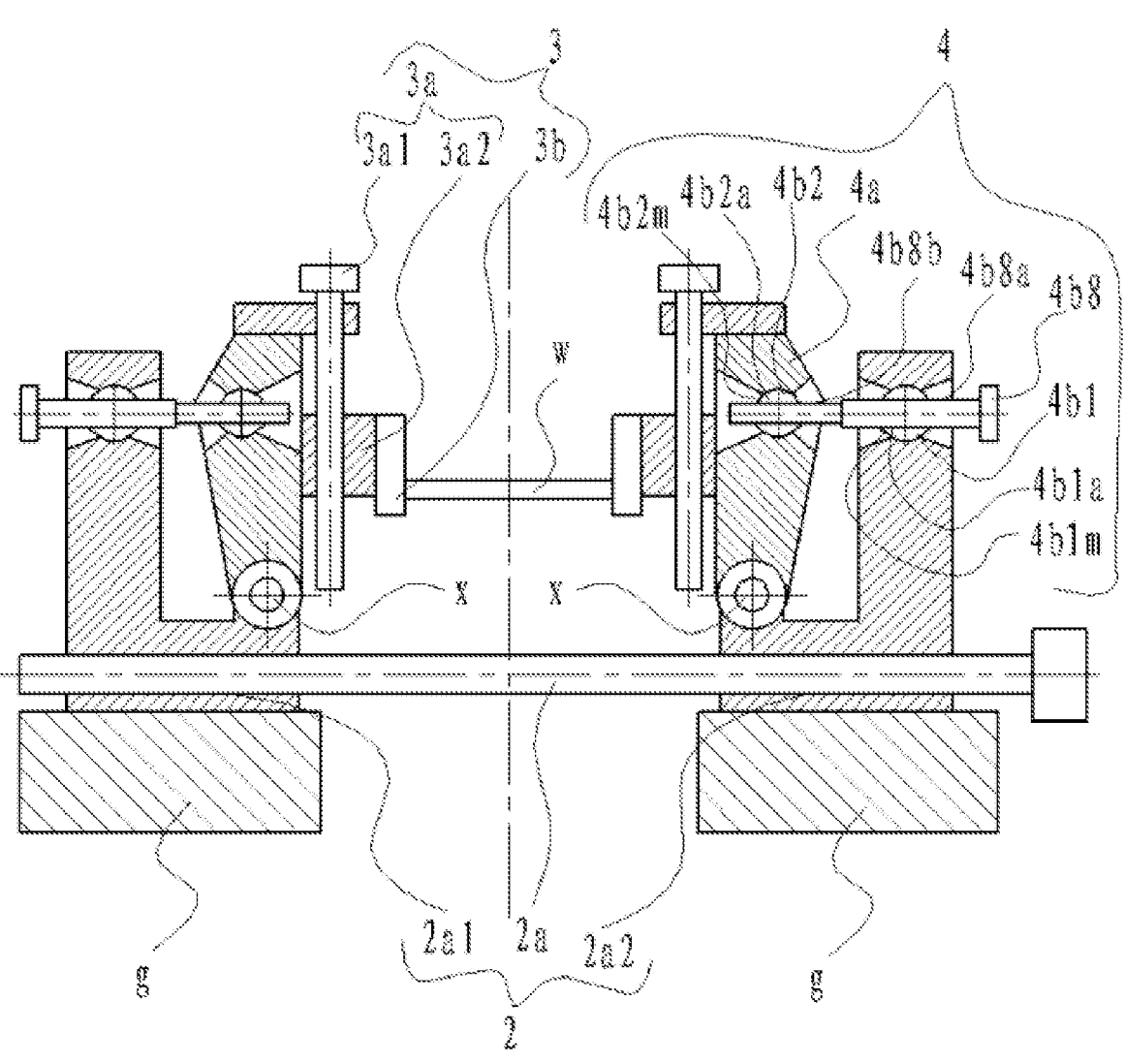
FIG. 2 is a schematic diagram of an edge trimming device 3 in a changed working position in the first embodiment of the present disclosure.

FIG. 2 is a schematic diagram of an edge trimming device 3 in a changed working position in the first embodiment of the present disclosure.

As shown in FIG. 1, the embodiment of the present disclosure provides a plate material edge trimming machine for trimming and processing a shape and appearance of edges of a continuous plate material in an automatic production line. By providing a lifting assembly that can adjust a position of a working cutter edge of an edge trimming cutter and a swinging device that can change a working angle of the edge trimming cutter, a cutter replacement cycle of the edge trimming cutter can be prolonged and usage and processing ranges of the production line can be expanded, thereby improving the work efficiency of the production line. The specific structure of the plate material edge trimming machine may include a stationary base g for supporting and fixing, a sliding seat 1 installed above the stationary base g and capable of sliding left or right on the stationary base g, a sliding seat adjusting device 2 for adjusting a moving distance of the sliding seat 1, and an edge trimming device 3 for trimming and processing the shape and appearance of edges of a continuous plate material w arranged on the sliding seat 1. The present implementation adopts a left-right symmetrical arrangement, that is, the sliding seat 1 may include a first sliding seat 1*a* and a second sliding seat 1*b*, with the first sliding seat 1*a* and the second sliding seat 1*b* respectively arranged on two corresponding sides. The present implementation is characterized in that the edge trimming device 3 further includes a lifting assembly 3*a* and an edge trimming cutter 3*b*, the edge trimming cutter 3*b* is installed on the lifting assembly 3*a*, and the lifting assembly 3*a* can drive the edge trimming cutter 3*b* to move up and down, thereby quickly changing the position of the working cutter edge of the edge trimming cutter 3*b* and reducing the time spent on replacement of the edge trimming cutter 3*b*. The lifting assembly 3*a* further includes a threaded rod 3*a*1 and a lifting seat 3*a*2, the edge trimming cutter 3*b* is installed on the lifting seat 3*a*2, the threaded rod 3*a*1 is matched with the lifting seat 3*a*2 through thread transmission, and by rotating the threaded rod 3*a*1, the edge trimming cutter 3*b* can be moved up and down. Further, a swinging device 4 is further provided between the sliding seat 1 and the edge trimming device 3. The swinging device 4 further includes a swinging seat 4*a* and a swing adjusting assembly 4*b*. The swinging seat 4*a* is hinged with the sliding seat 1 through a pin x, and can swing around the pin x relative to the sliding seat 1. The edge trimming device 3 is disposed on the swinging seat 4*a*, where the lifting seat 3*a*2 is installed on the swinging seat 4*a* and can slide up and down relative to the swinging seat 4*a*, and the threaded rod 3*a*1 is installed on the swinging seat 4*a* and can rotate relative to the swinging seat 4*a*. By mean of direct replacements with the technical means commonly used by the person skilled in the art, the lifting assembly 3*a* in the present implementation can be directly replaced with other commonly used technical solutions, for example, a hydraulic or pneumatic cylinder may be used to drive the edge trimming cutter 3*b* to move up and down, with one end of the hydraulic or pneumatic cylinder fixed on the swinging seat 4*a*, and the other end of the hydraulic or pneumatic cylinder fixed on the lifting seat 3*a*2, and by extension and retraction of the hydraulic or pneumatic cylinder, the edge trimming device 3*b* can move up and down following the lifting seat 3*a*2 to change its working position.

Figure 3:
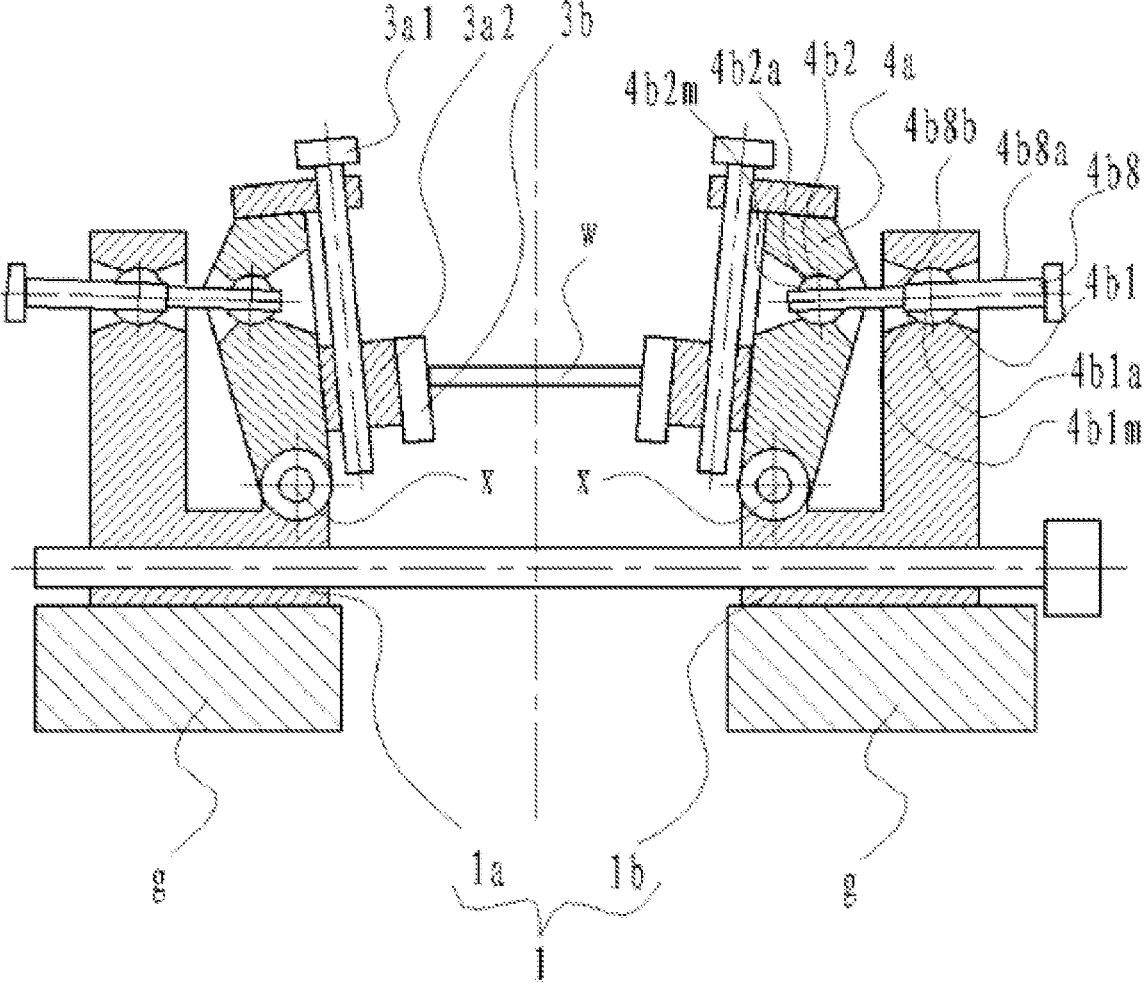
FIG. 3 is a schematic diagram of a swinging seat 4a swinging outward in the first embodiment of the present disclosure.

FIG. 3 is a schematic diagram of the swinging seat 4*a* swinging outward in the first embodiment of the present disclosure.

Figure 4:
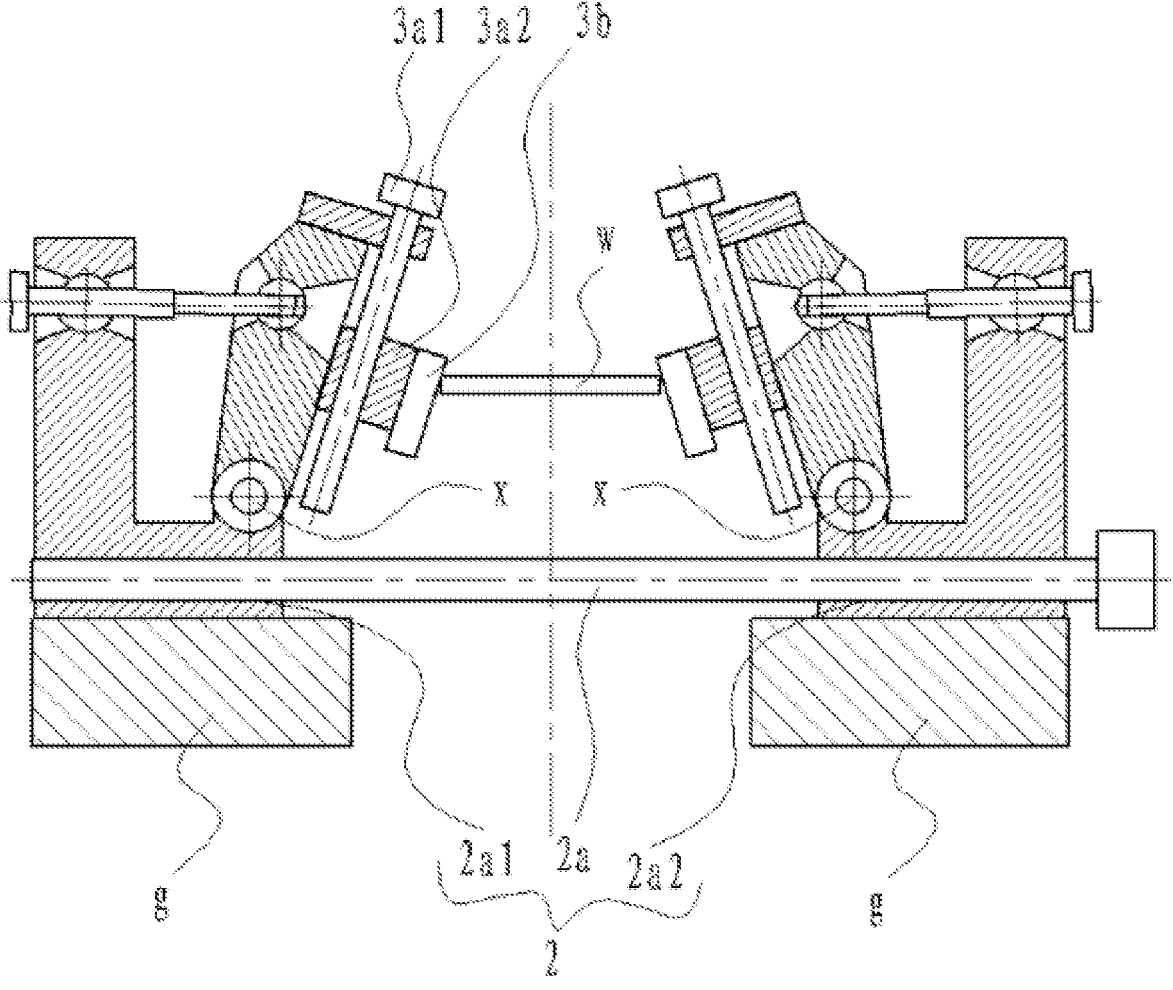
FIG. 4 is a schematic diagram of a swinging seat 4a swinging inward in the first embodiment of the present disclosure.

FIG. 4 is a schematic diagram of the swinging seat 4*a* swinging inward in the first embodiment of the present disclosure.

According to one aspect of the embodiment of the present disclosure, as shown in FIGS. 3 and 4, the swing adjusting assembly 4*b* further includes an adjusting bolt 4*b*8 and a first swinging body 4*b*1. The adjusting bolt 4*b*8 is further provided with a first thread 4*b*8*a*, and the first swinging body 4*b*1 is further provided with a first swinging body thread 4*b*1*a* that can be matched with the first thread 4*b*8*a* for use, and a first rotating surface 4*b*1*m* that can rotate relative to the sliding seat 1. The swing adjusting assembly 4*b* further includes a second swinging body 4*b*2, the adjusting bolt 4*b*8 further includes a second thread 4*b*8*b*, and the second swinging body 4*b*2 is further provided with a second swinging body thread 4*b*2*a* that can be matched with the second thread 4*b*8*b* for use, and a second rotating surface 4*b*2*m* that can rotate relative to the swinging seat 4*a*. The first rotating surface 4*b*1*m* and the second rotating surface 4*b*2*m* may be formed as cylindrical surfaces, that is, the first swinging body 4*b*1 and the second swinging body 4*b*2 may both be formed as cylinders. However, the present implementation may adopt a more preferred solution, that is, the first rotating surface 4*b*1*m* and the second rotating surface 4*b*2*m* are both formed as spherical surfaces, while the first swinging body 4*b*1 and the second swinging body 4*b*2 are both formed as spheres, and thus it is more convenient for the first swinging body 4*b*1 and the second swinging body 4*b*2 to rotate within the sliding seat 1*a* and the swinging seat 4*a*, respectively. The first thread 4*b*8*a* and the second thread 4*b*8*b* of the adjusting bolt 4*b*8 are respectively arranged in two sections of the adjusting bolt 4*b*8 at different positions in a length direction. Technically, in order to achieve a difference in transmission distance between the two sections of threads, the first thread 4*b*8*a* and the second thread 4*b*8*b* can adopt threads with opposite rotation directions. However, in the case of adopting such solution, a significant difference in transmission distance will be generated between the two sections of threads with opposite rotation directions during rotation, which is not conducive to usage in situations where fine adjustment is required. The present implementation adopts a more preferred solution, that is, in order to achieve a difference in the transmission distance between the two sections of threads and thus achieve a fine adjustment, the first thread 4*b*8*a* and the second thread 4*b*8*b* are formed with the same rotation direction while with different thread pitches. As a result, when rotating the adjusting bolt 4*b*8, a relatively smaller displacement difference between the objects installed on the first thread 4*b*8*a* and the second thread 4*b*8*b* can be generated due to the different thread pitches of the two sections of threads. As such, the first thread 4*b*8*a* of the adjusting bolt 4*b*8 is installed in the first swinging body 4*b*1 and is matched with the first swinging body thread 4*b*1*a* for transmission, the second thread 4*b*8*b* of the adjusting bolt 4*b*8 is installed in the second swinging body 4*b*2 and is matched with the second swinging body thread 4*b*2*a* for transmission, the first swinging body 4*b*1 is installed in the sliding seat 1, the second swinging body 4*b*2 is installed in the swinging seat 4*a*, and, by rotating the adjusting bolt 4*b*8, a fine change in the distance between the first swinging body 4*b*1 and the second swinging body 4*b*2 can be achieved, thereby achieving a change in an angle of the swinging seat 4*a*.

According to one aspect of the embodiment of the present disclosure, the sliding seat adjusting device 2 is further provided with a transmission screw rod 2a, which is further provided with a first transmission thread 2a1 and a second transmission thread 2a2. The first transmission thread 2a1 and the second transmission thread 2a2 have opposite thread directions, the first sliding seat 1a is provided with an internal thread that can be matched with the first transmission thread 2a1, the second sliding seat 1b is provided with an internal thread that can be matched with the second transmission thread 2a2. By rotating the transmission screw rod 2a, the first sliding seat 1a and the second sliding seat 1b can synchronously approach or move away from each other, thereby adjusting a processing width of the continuous plate material w.

Figure 5:
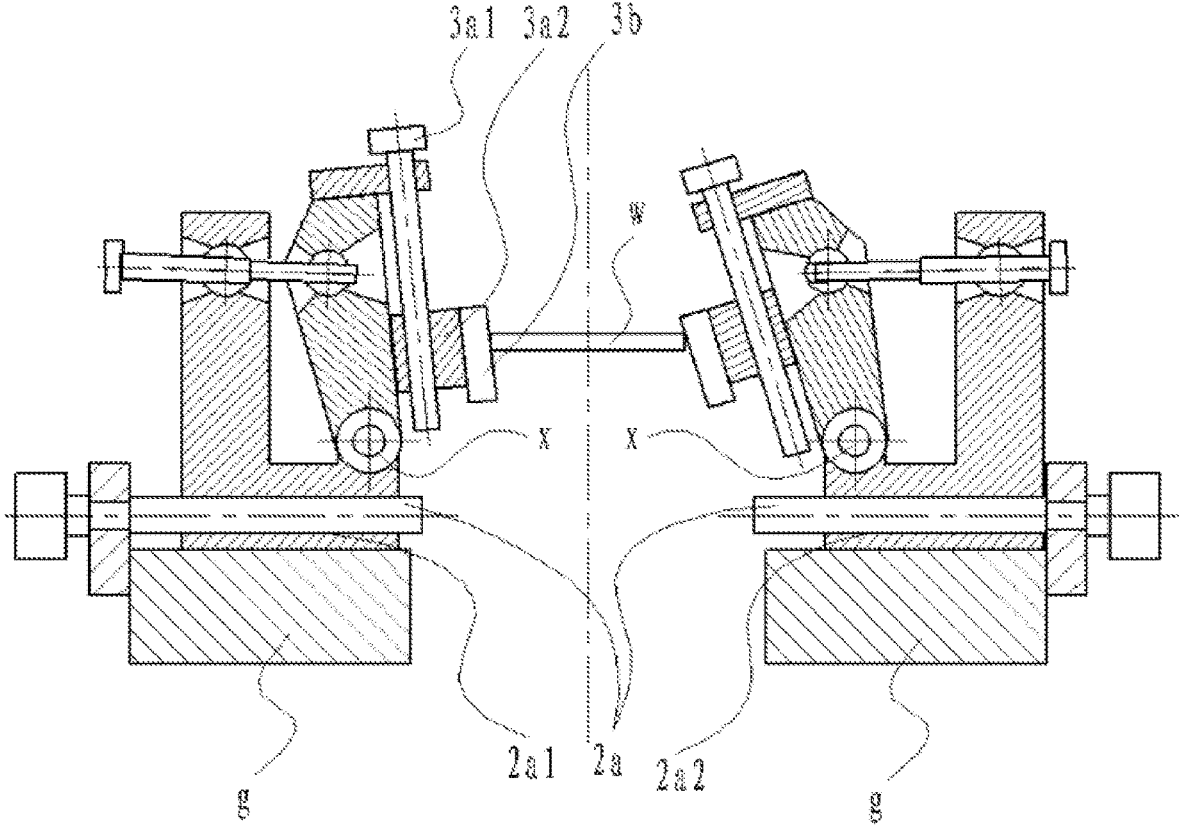
FIG. 5 is a schematic diagram of a swinging seat 4a swinging left in the second embodiment of the present disclosure.

FIG. 5 is a schematic diagram of a swinging seat 4a swinging left in a second embodiment of the present disclosure.

Figure 6:
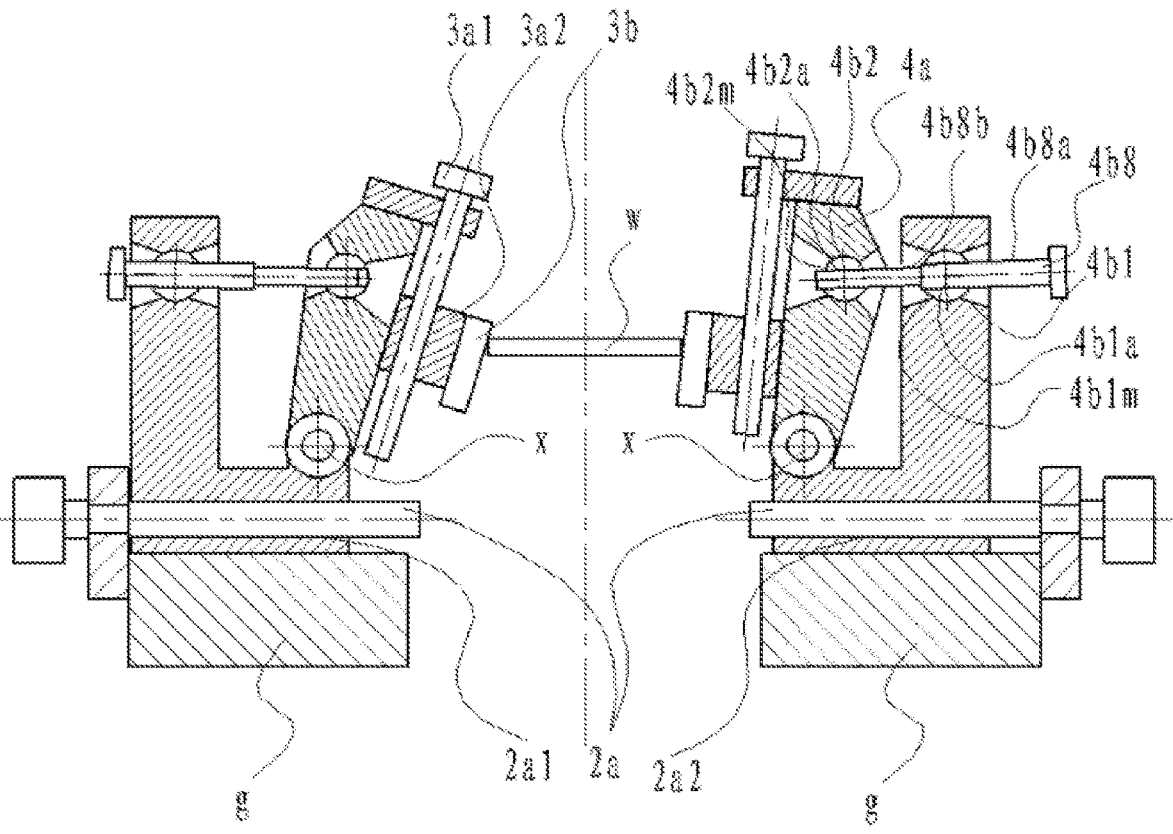
FIG. 6 is a schematic diagram of a swinging seat 4a swinging right in the second embodiment of the present disclosure.

FIG. 6 is a schematic diagram of a swinging seat 4a swinging right in a second embodiment of the present disclosure.

As shown in FIGS. 5 and 6, according to one aspect of the second embodiment of the present disclosure, it differs from the previous embodiment in the following specific distinguishing technical feature: the first sliding seat 1a and the second sliding seat 1b are respectively provided with transmission screw rods 2a, and by rotating the transmission screw rods 2a, the first sliding seat 1a and the second sliding seat 1b can slide relative to the stationary base g respectively. The two sets of edge trimming devices 3 in a left-right symmetrical arrangement, can achieve their respective processing work under the action of the symmetrical two sets of swinging devices 4 respectively, thereby making the present plate material edge trimming machine suitable for a wider range of working conditions.

Figure 7:
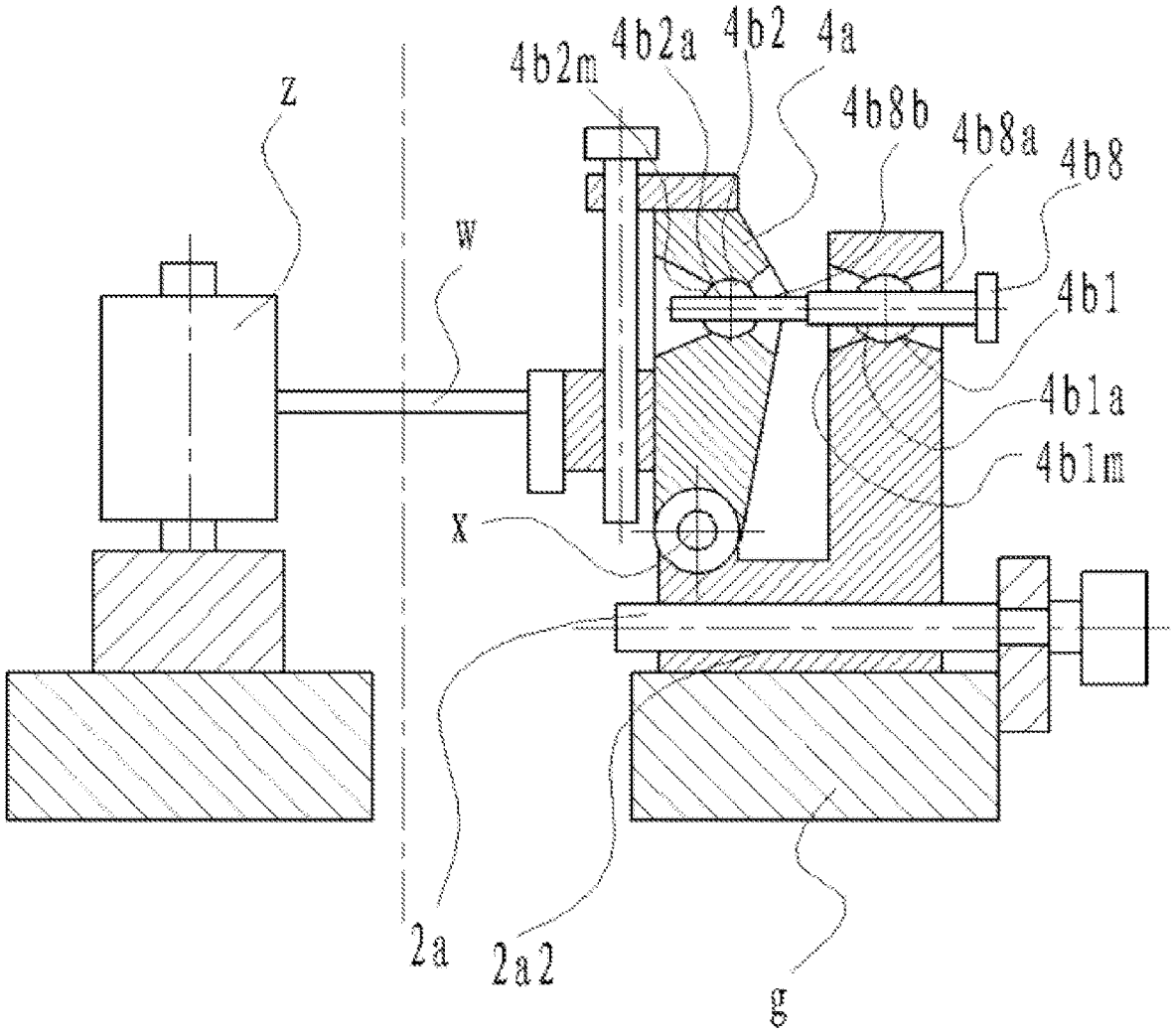
FIG. 7 is a schematic diagram of a basic structure in a third embodiment of the present disclosure.

FIG. 7 is a schematic diagram of a basic structure in a third embodiment of the present disclosure.

As shown in FIG. 7, according to one aspect of the third embodiment of the present disclosure, it differs from the previous embodiment in the following specific distinguishing technical feature: the machine includes only one set of the edge trimming device 3 and the swinging device 4, which facilitates to process the continuous plate material w that needs to be processed only on one side. The machine specifically may be provided with a supporting roller z on the other side, which can fix a working position of the continuous plate material w.

Figure 8:
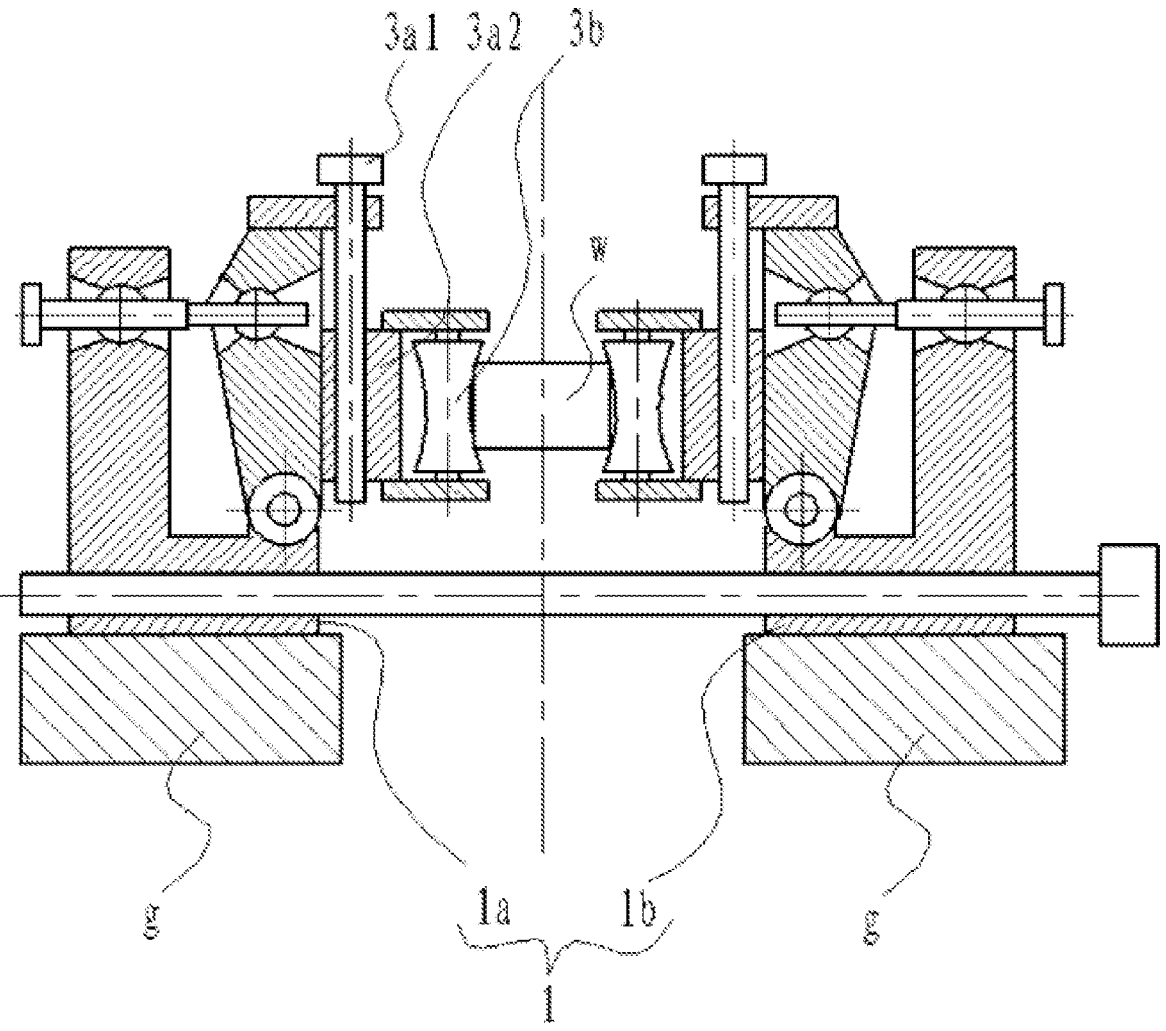
FIG. 8 is a schematic diagram of a basic structure in a fourth embodiment of the present disclosure.

FIG. 8 is a schematic diagram of a basic structure in a fourth embodiment of the present disclosure.

As shown in FIG. 8, according to one aspect of the fourth embodiment of the present disclosure, it differs from the previous embodiment in the following specific distinguishing feature: the edge trimming cutter 3b in the edge trimming device 3 can be replaced with a device such as a forming roller cutter, a forming grinding wheel, or an abrasive belt that can also achieve the same processing.

Figure 9:
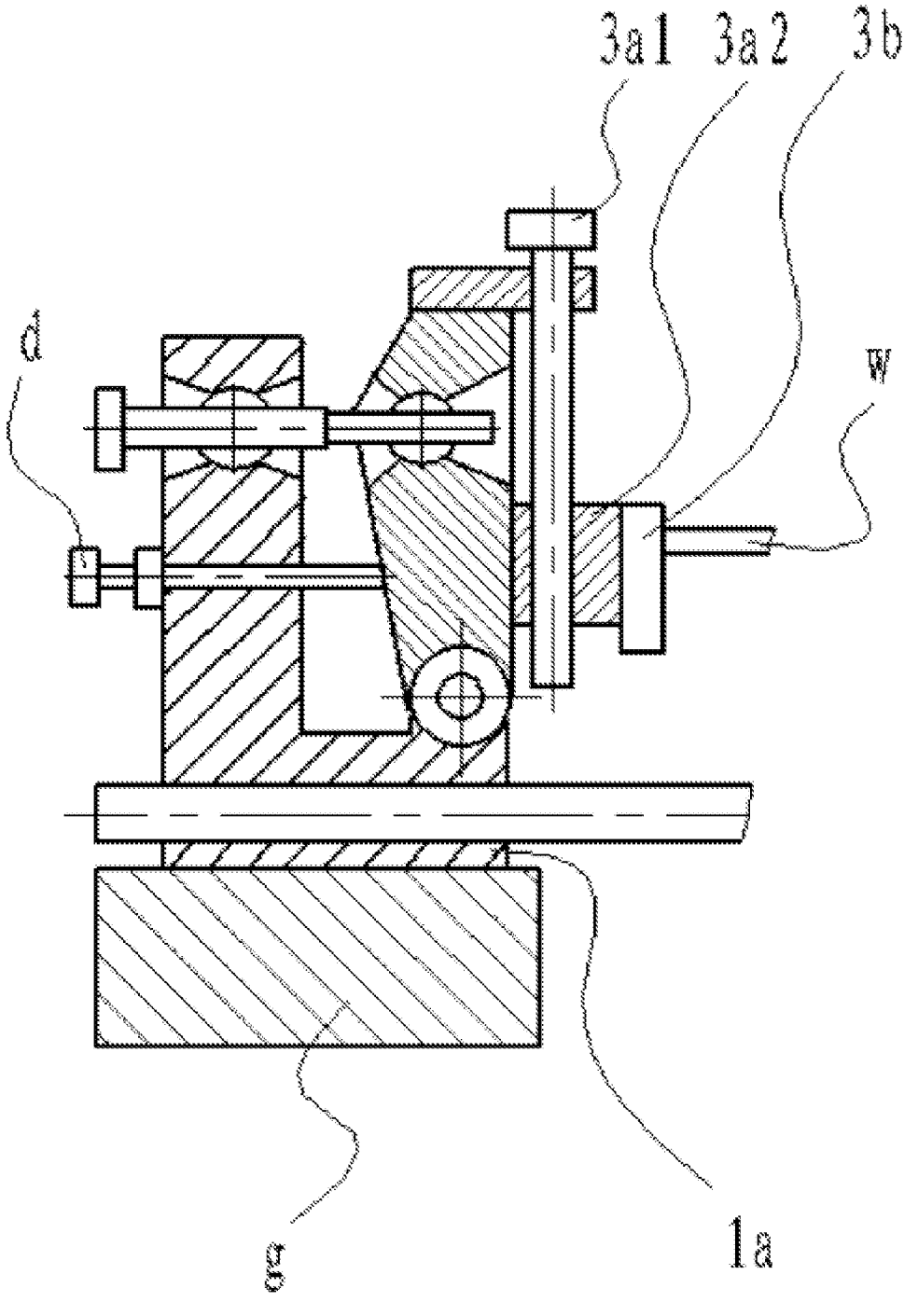
FIG. 9 is a schematic diagram of a basic structure in a fifth embodiment of the present disclosure.

FIG. 9 is a schematic diagram of a basic structure in a fifth embodiment of the present disclosure.

As shown in FIG. 9, according to one aspect of the fifth embodiment of the present disclosure, the sliding seat 1 may be further provided with a swinging seat positioning device d. The swinging seat positioning device d includes a bolt and a nut, and the sliding seat 1 is further provided with an internal thread corresponding to the bolt and the nut. By adjusting the position of the swinging seat positioning device d, the swinging position of the swinging seat 4a can be accurately positioned, so as to prevent excessive adjustment of the position of the swinging seat 4a.

The embodiments of the present application provide a plate material edge trimming machine for trimming a shape and appearance of edges of a continuous plate material is provided, the plate material edge trimming machine includes a sliding seat 1 and a sliding seat adjusting device 2, an edge trimming device 3 is further provided on the sliding seat 1 for trimming the shape and appearance of the edges of the continuous plate material, and the sliding seat adjusting device 2 is adapted to adjust a working position of the sliding seat 1, wherein the edge trimming device 3 further includes a lifting assembly 3a and an edge trimming cutter 3b, the edge trimming cutter 3b is installed on the lifting assembly 3a, and the lifting assembly 3a can drive the edge trimming cutter 3b to move up and down, so as to quickly change a position of a working cutter edge of the edge trimming cutter 3b and reduce a time spent on replacement of the edge trimming cutter 3b.

According to one aspect of the embodiments of the present disclosure, the lifting assembly 3a includes a threaded rod 3a1 and a lifting seat 3a2, the edge trimming cutter 3b is installed on the lifting seat 3a2, the threaded rod 3a1 is matched with the lifting seat 3a2 through thread transmission, and by rotating the threaded rod 3a1, the edge trimming cutter 3b can be moved up and down.

According to one aspect of the embodiments of the present disclosure, a swinging device 4 is further provided between the sliding seat 1 and the edge trimming device 3, the swinging device 4 further includes a swinging seat 4a and a swing adjusting assembly 4b, the swinging seat 4a is hinged with the sliding seat 1 by a pin x, the edge trimming device 3 is disposed on the swinging seat 4a, and the swing adjusting assembly 4b can drive the swinging seat 4a to swing so as to adjust a working angle of the edge trimming device 3.

According to one aspect of the embodiments of the present disclosure, the lifting seat 3a2 is installed on the swinging seat 4a and can slide up and down relative to the swinging seat 4a, and the threaded rod 3a1 is installed on the swinging seat 4a and can rotate relative to the swinging seat 4a.

According to one aspect of the embodiments of the present disclosure, the swing adjusting assembly 4b further includes an adjusting bolt 4b8 and a first swinging body 4b1, the adjusting bolt 4b8 is further provided with a first thread 4b8a, and the first swinging body 4b1 is further provided with a first swinging body thread 4b1a that can be matched with the first thread 4b8a for use and a first rotating surface 4b1m that can rotate relative to the sliding seat 1; and the adjusting bolt 4b8 is installed in the first swinging body 4b1, the first swinging body 4b1 is installed in the sliding seat 1, a first end of the adjusting bolt 4b8 is coupled with the swinging seat 4a, and by rotating the adjusting bolt 4b8, an angle of the swinging seat 4a can be changed.

According to one aspect of the embodiments of the present disclosure, the swing adjusting assembly 4b further includes a second swinging body 4b2, the adjusting bolt 4b8 further includes a second thread 4b8b, and the second swinging body 4b2 is further provided with a second swinging body thread 4b2a that can be matched with the second thread 4b8b for use and a second rotating surface 4b2m that can rotate relative to the swinging seat 4a; the second thread 4b8b on the adjusting bolt 4b8 is installed in the second swinging body 4b2, the second swinging body 4b2 is installed in the swinging seat 4a, and by rotating the adjusting bolt 4b8, a distance between the first swinging body 4b1 and the second swinging body 4b2 can be changed, thereby achieving a change in the angle of the swinging seat 4a.

According to one aspect of the embodiments of the present disclosure, the sliding seat adjusting device 2 is further provided with a transmission screw rod 2a, the transmission screw rod 2a is further provided with a first transmission thread 2a1 and a second transmission thread 2a2, and the first transmission thread 2a1 and the second transmission thread 2a2 have opposite thread directions; the sliding seat 1 is further provided with a first sliding seat 1a and a second sliding seat 1b, the first sliding seat 1a is provided with an internal thread that can be matched with the first transmission thread 2a1, and the second sliding seat 1b is provided with an internal thread that can be matched with the second transmission thread 2a2; and by rotating the transmission screw rod 2a, the first sliding seat 1a and the second sliding seat 1b can synchronously approach or move away from each other, thereby adjusting a processing width of the continuous plate material w.

According to one aspect of the embodiments of the present disclosure, the sliding seat 1 is further provided with a swinging seat positioning device d, which includes a bolt and a nut, the sliding seat 1 is further provided with an internal thread corresponding to the bolt and the nut, and by adjusting a position of the swinging seat positioning device d, a swinging position of the swinging seat 4a can be accurately positioned so as to prevent excessive adjustment of a position of the swinging seat 4a.

It should be understood that the illustration of the specific embodiments of the present disclosure in the specification is exemplary and should not be interpreted as an improper limitation on the scope of protection of the present disclosure. The scope of protection of the present disclosure is defined by the claims, and covers all the implementations falling within its scope and the obvious equivalent variations thereof.

What is claimed is:

1. A plate material edge trimming machine for trimming a shape and appearance of edges of a continuous plate material, the plate material edge trimming machine comprising a sliding seat and a sliding seat adjusting device, an edge trimming device being further provided on the sliding seat for trimming the shape and appearance of the edges of the continuous plate material, and the sliding seat adjusting device being adapted to adjust a working position of the sliding seat, wherein the edge trimming device further comprises a lifting assembly and an edge trimming cutter, the edge trimming cutter is installed on the lifting assembly, and the lifting assembly can drive the edge trimming cutter to move up and down, so as to quickly change a position of a working cutter edge of the edge trimming cutter and reduce a time spent on replacement of the edge trimming cutter, and wherein a swinging device is further provided between the sliding seat and the edge trimming device, the swinging device further comprises a swinging seat and a swing adjusting assembly, the swinging seat is hinged with the sliding seat by a pin, the edge trimming device is disposed on the swinging seat, and the swing adjusting assembly can drive the swinging seat to swing so as to adjust a working angle of the edge trimming device.

2. The plate material edge trimming machine according to claim 1, wherein the lifting assembly comprises a threaded rod and a lifting seat, the edge trimming cutter is installed on the lifting seat, the threaded rod is matched with the lifting seat through thread transmission, and by rotating the threaded rod, the edge trimming cutter can be moved up and down.

3. The plate material edge trimming machine according to claim 2, wherein the lifting seat is installed on the swinging seat and can slide up and down relative to the swinging seat, and the threaded rod is installed on the swinging seat and can rotate relative to the swinging seat.

4. The plate material edge trimming machine according to claim 3, wherein the swing adjusting assembly further comprises an adjusting bolt and a first swinging body, the adjusting bolt is further provided with a first thread, and the first swinging body is further provided with a first swinging body thread that can be matched with the first thread for use and a first rotating surface that can rotate relative to the sliding seat;

the adjusting bolt is installed in the first swinging body, the first swinging body is installed in the sliding seat, a first end of the adjusting bolt is coupled with the swinging seat, and by rotating the adjusting bolt, an angle of the swinging seat can be changed.

5. The plate material edge trimming machine according to claim 4, wherein the swing adjusting assembly further comprises a second swinging body, the adjusting bolt further comprises a second thread, and the second swinging body is further provided with a second swinging body thread that can be matched with the second thread for use and a second rotating surface that can rotate relative to the swinging seat;

the second thread on the adjusting bolt is installed in the second swinging body, the second swinging body is installed in the swinging seat, and by rotating the adjusting bolt, a distance between the first swinging body and the second swinging body can be changed, thereby achieving a change in the angle of the swinging seat.

6. The plate material edge trimming machine according to claim 5, wherein the sliding seat adjusting device is further provided with a transmission screw rod, the transmission screw rod is further provided with a first transmission thread and a second transmission thread, and the first transmission thread and the second transmission thread have opposite thread directions;

the sliding seat is further provided with a first sliding seat and a second sliding seat, the first sliding seat is provided with an internal thread that can be matched with the first transmission thread, and the second sliding seat is provided with an internal thread that can be matched with the second transmission thread; and by rotating the transmission screw rod, the first sliding seat and the second sliding seat can synchronously approach or move away from each other, thereby adjusting a processing width of the continuous plate material.

7. The plate material edge trimming machine according to claim 6, wherein the sliding seat is further provided with a swinging seat positioning device, which comprises a bolt and a nut, the sliding seat is further provided with an internal thread corresponding to the bolt and the nut, and by adjusting a position of the swinging seat positioning device, a swinging position of the swinging seat can be accurately positioned so as to prevent excessive adjustment of a position of the swinging seat.

\* \* \* \* \*